United States Patent
Francis

(10) Patent No.: US 9,809,117 B1
(45) Date of Patent: Nov. 7, 2017

(54) ELECTRIC VEHICLE RANGE EXTENDER CHARGE SYSTEM

(71) Applicant: Newberry Francis, Saint Louis, MO (US)

(72) Inventor: Newberry Francis, Saint Louis, MO (US)

( * ) Notice: Subject to any disclaimer, the term of this patent is extended or adjusted under 35 U.S.C. 154(b) by 0 days.

(21) Appl. No.: 14/999,673

(22) Filed: May 10, 2016

(51) Int. Cl.
*B60L 11/00* (2006.01)
*B60L 11/18* (2006.01)

(52) U.S. Cl.
CPC .......... *B60L 11/002* (2013.01); *B60L 11/18* (2013.01); *B60Y 2300/91* (2013.01); *B60Y 2400/112* (2013.01)

(58) Field of Classification Search
CPC ...... B60L 11/002; B60L 11/12; B60L 11/123; B60L 11/18; B60L 11/1811–11/1812
See application file for complete search history.

(56) References Cited

U.S. PATENT DOCUMENTS

| | | | | | |
|---|---|---|---|---|---|
| 3,556,239 | A | * | 1/1971 | Spahn | B60K 1/00 180/2.2 |
| 3,566,985 | A | * | 3/1971 | Triplett | B60K 1/00 180/214 |
| 8,561,744 | B1 | * | 10/2013 | Belloso | B60K 5/08 180/69.6 |
| 8,858,391 | B2 | * | 10/2014 | Tolkacz | B60K 17/02 180/65.22 |
| 2013/0332014 | A1 | * | 12/2013 | Jackson | B60L 11/1803 701/22 |

\* cited by examiner

*Primary Examiner* — Erez Gurari
(74) *Attorney, Agent, or Firm* — Lewis Rice LLC

(57) ABSTRACT

In an electric vehicle having a primary battery powered source of energy with a primary electric motor driven and connected to one or more ground engagement wheels of the electric vehicle, has a device called a sprocket used for collecting energy form the inner rim edge of the rear wheel of the electric vehicle. This sprocket mechanism device collects this energy then transfers that energy to alternators one and two on its mounted framework in the trunk compartment by way of a chain. The two alternators with its sitting pilot voltages, then transfer it by required electrically conductive cables sending energy to the battery bank source thus completing the on board charging system cycle.

1 Claim, 2 Drawing Sheets

ELECTRIC VEHICLE RANGE EXTENDER CHARGE SYSTEM

CROSS REFERENCE TO RELATED APPLICATIONS

Not Applicable

STATEMENT REGARDING FEDERALLY SPONSORED RESEARCH DEVELOPMENT

Not Applicable

REFERENCE TO SEQUENCES LISTING, A TABLE, OR A COMPUTER PROGRAM LISTING COMPACT DISC APPENDIX

Not Applicable

BACKGROUND OF THE INVENTION

The present invention relates to an auxiliary power transfer device for an electric vehicle and more particularly to an auxiliary mounted sprocket source device powered by one or more wheels of an electric vehicle powered solely by batteries are well known and the electric vehicle whose drive systems are powered solely by battery sources are well known. Combining the two sources of energy to drive an electric vehicle has heretofore been deemed practical.

BRIEF SUMMARY OF THE INVENTION

In accordance with the invention, therefore, there is provided an electric vehicle comprising a primary electric motor powered by a primary battery bank source with electrical energy. The primary motor being driven and connected to one or more plurality of ground engagement wheels mounted on the electric vehicle; an auxiliary device driven and connected to one or more of the ground engagement wheels; a sprocket energy collecting device mounted on the electric vehicle for connecting to the wheels rotating energy; the sprocket energy collecting device included as an energy supply mechanism routing energy collected from the rear wheel inner rim edge.

The energy supply device comprises a battery bank source and an electrically conductive cable connected to the primary motor collecting device and delivering energy to one or more of the ground engagement wheels.

The energy supply device further comprise connections between the two alternator devices and receives energy from the wheel driven sprocket sending an electrically conductive cable to the battery bank source.

The primary battery bank source and the primary electric vehicle motor devices will alternately be driven and or connected electrically to a common ground engagement wheel.

The primary electric vehicle motor device typically includes an energy regenerator connected to the battery bank source while the energy regenerator is being driven and connected to the wheel which is driven and connected to a sprocket mechanism device mounted on the inner rim edge of the rear wheel and operating to regenerate energy for storage and usage in the battery bank source in response to the rotation of the connected and driven wheel. A modular gear box on the other hand consisting of several hard plastic and or metal gears is known as being capable of replacing the sprocket mechanism devices for space and strength are well known.

DETAILED DESCRIPTION OF THE INVENTION OF THE PREFERRED EMBODIMENTS

Figure 1:
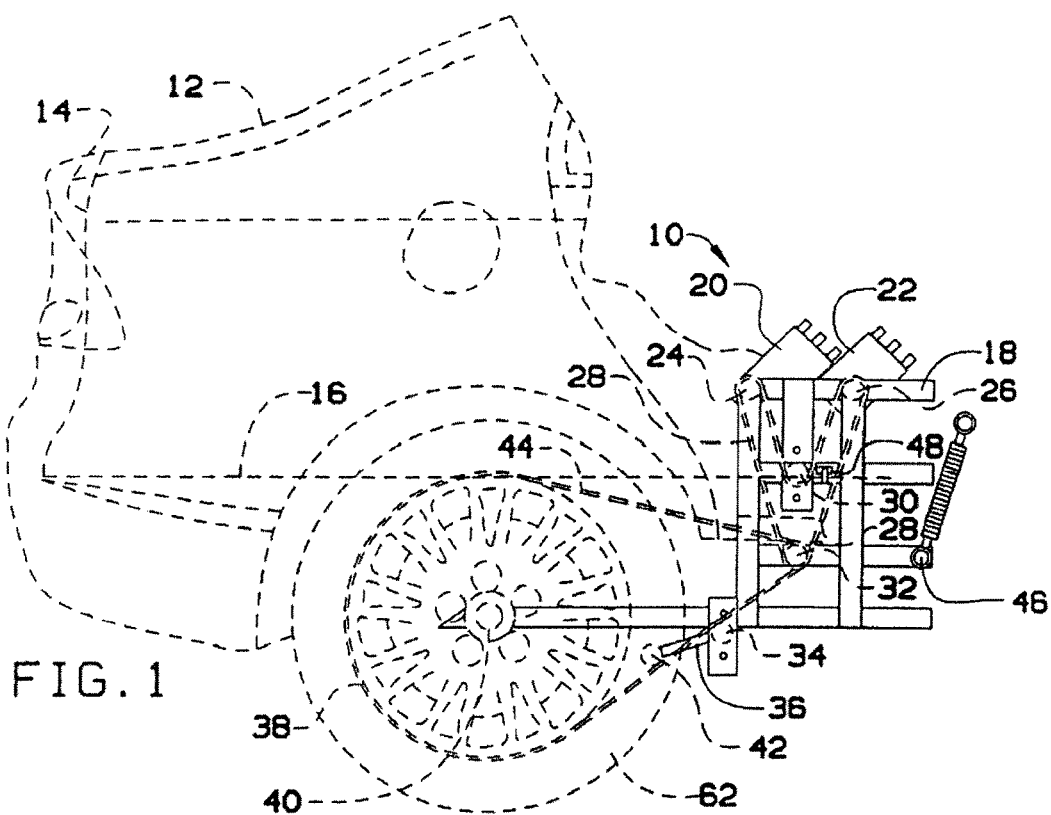
FIG. 1 depicts an embodiment of the invention according to the present disclosure.
Figure 2:
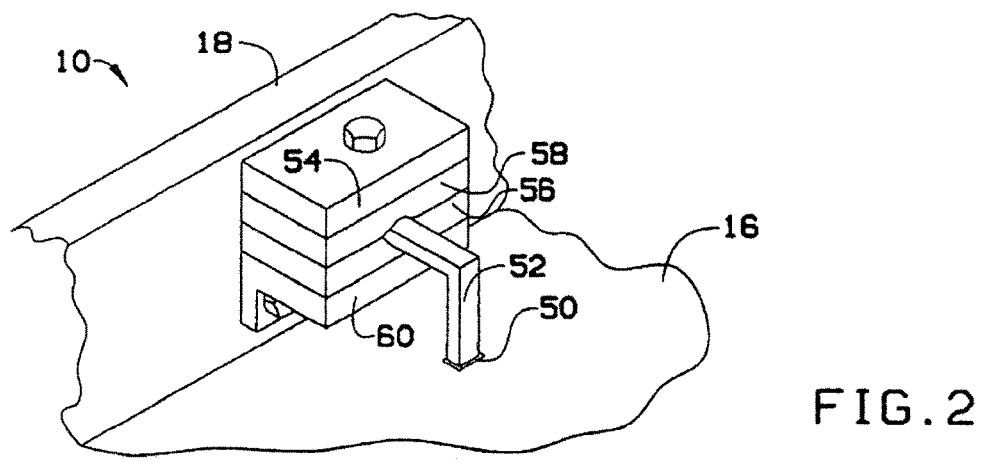
FIG. 2, illustrates the sway bar stabilizer mounted on the steel support frame to ensure the lateral balance of the steel support structure by placing the ninety degree sway bar in a recessed hole featuring a metal keyway apparatus on the trunk floor of the vehicle that allows the sway bar to move freely up and down with the motions of the entire supporting structure.
Figure 3:
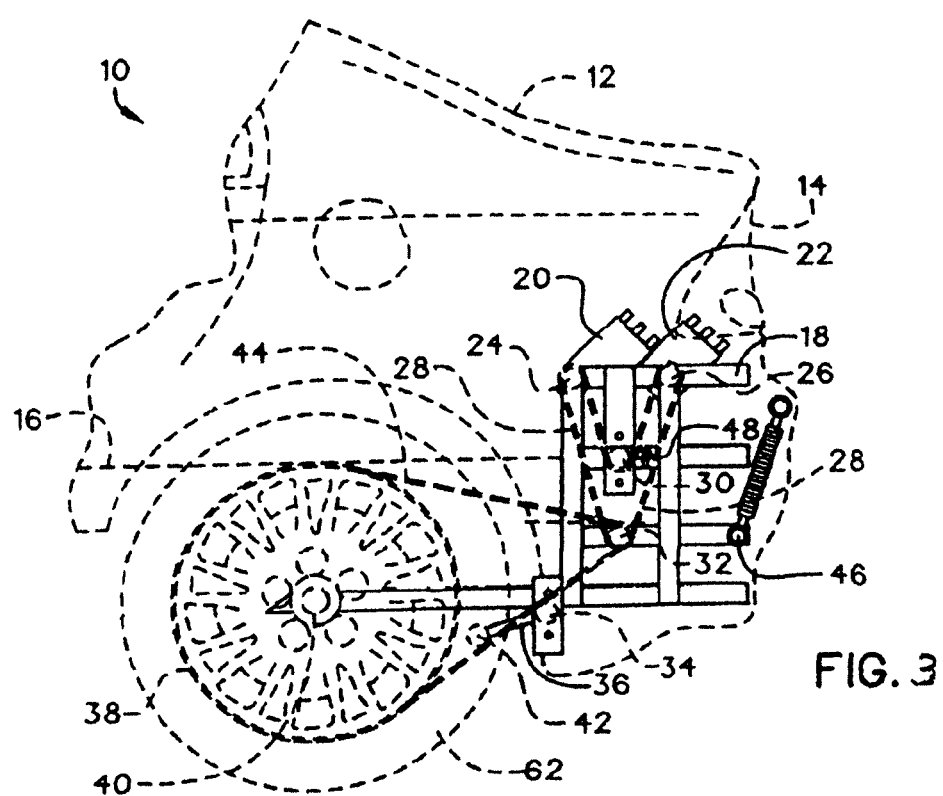
FIG. 3 depicts an embodiment of the invention according to the present disclosure.

It will be readily understood that the components of the present invention, as generally described and illustrated in the figures herein, could be arranged and designed in a wide variety of different configurations. thus, the following more detailed description of the embodiment of the system and method of the present invention and represented in FIGS. 1 and 2, is not intended to limit the scope of the invention, as claimed, but is merely representative of the presently preferred embodiment of the invention. The presently preferred embodiments of the invention will be best understood by reference to the drawings wherein like parts are designated by like numerals throughout the features of this structure consist of Alternators, sprockets, idler sprockets chain adjustment plate assemblies, connectors, sway bar stabilizer, dual sprockets, a wheel with a sprocket and shock absorber. It is constructed with a steel frame and all equipment listed above and either welded or anchored by bolts at the rear wheel support structure. The mode of operation come into play when and only when the electric vehicle moves forward. It works by using a sitting input voltage at the alternator windings coming from the battery circuits and ignition selector contact switch to the alternator, then outputs to the battery bank source provides a constant serge of regulated voltage and current flow as long as the electric vehicle is operating in a forward motion.

Turning now to the drawings, FIG. 1: is a perspective side view of the invention 10 is the overall invention.

FIG. 1: is a perspective side view of the invention 10. The exemplary vehicle is 12.

FIG. 1: is a perspective side view of the invention 10. The exemplary vehicles trunk compartment is 14.

FIG. 1: is a perspective side view of the invention 10. The exemplary vehicles trunk floor is 16.

FIG. 1: is a perspective side view of the invention 10. The steel frame mounting and support structure is 18.

FIG. 1: is a perspective side view of the invention 10. The alternator number 1 is 20.

FIG. 1: is the perspective side view of the invention 10. Alternator number 2 is 22.

FIG. 1: is the perspective side view of the invention 10. The alternator number 1 sprocket Is 24.

FIG. 1: is the perspective side view of the invention 10. The alternator number 2 sprocket Is 26.

FIG. 1: is the perspective side view of the invention 10. The alternators chain is 28.

FIG. 1: is the perspective side view of the invention 10. The alternators chain tension flat idler sprocket is 30.

FIG. 1: is the perspective side view of the invention 10. The transfer sprocket is 32.

FIG. 1: is the Perspective side view of the Invention 10. The chain adjusting flat sprocket is 34.

FIG. 1: is the perspective side view of the invention 10. The guide sprocket arm is 36.

FIG. 1: is the perspective side view of the invention 10. The main drive sprocket is 38.

FIG. 1: is the perspective side view of the invention 10. The exemplary vehicles axle is 40.

FIG. 1: is the perspective side view of the invention 10. The main chain guide sprocket is 42.

FIG. 1: is the perspective side view of the invention 10. The main chain is 44.

FIG. 1: is the perspective side view of the invention 10. The shock absorber is 46.

FIG. 1, illustrates the main primary steel structure revealing all of the positions, and there particular location. The steel frame will either be bolted or welded to the rear wheel assembly support structure to ensure that entire and or complete assembly will move up and down in unison at all times with the vehicle suspension system for a smooth and uninterrupted operation, for the sake of the complete charging system with a sway bar stabilizer affix to the frame for lateral balance.

FIG. 1, illustrates the steel structural support frame.

FIG. 1, illustrates the rear tire assembly equipped with the main primary sprocket and chain to drive the charging system.

FIG. 1, illustrates the lower chain adjusting plate assembly consisting of one sprocket chain guide and flat idler sprocket.

FIG. 1, illustrates the double sprocket apparatus featuring the two sprocket chain junction as the main connecting points for a successful operation of the electric vehicle range extender charging system.

FIG. 1, illustrates the upper chain adjusting plate assembly consisting of one idler sprocket mechanism that connects to both alternators by a sprocket chain.

FIG. 1, illustrates alternator 1 mounted on the steel support frame with its sprocket and connected to a flat idler sprocket on the upper adjusting chain plate assembly in concert with alternator 2, then a follow up connection to the dual secondary sprocket FIG. 1 alternator 1 also provide the electrical connection output to the battery connection input, then alternator 1 input is received from the vehicle ignition selector switch battery output. Finally, the ground connection from alternator 1 is connected to the ground point at the battery.

FIG. 1, illustrates alternator 2 mounted on the steel support Frame with its sprocket and connected to a flat idler sprocket on the upper adjusting chain plate assembly in concert with alternator 1, then a follow up connection to the dual secondary sprocket of FIG. 1, alternator 2 also provide the electrical connection output to the battery connection input, then the alternator input is received from the vehicle ignition selector switch battery output. Finally, the ground connection from alternator 2 is connected to the ground point at the battery.

FIG. 1, illustrates the shock absorber mounted at the end of the steel support frame to assist in suppressing excessive vertical movement with concerns about the overall length and weight of the steel frame support structure.

FIG. 2: is the perspective side view of the invention 10. The sway bar stabilizer is 48.

FIG. 2: is the perspective side view of the invention 10. The vehicles body frame slot is 50.

FIG. 2: is the perspective side view of the invention 10. The l-bracket is 52.

FIG. 2: is the perspective side view of the invention 10. The top metal plate is 54.

FIG. 2: is the perspective side view of the invention 10. The first rubber bushing is 56.

FIG. 2: is the perspective side view of the invention 10. The second rubber bushing is 58.

FIG. 2: is the perspective side view of the invention 10. The bottom metal base 90 degree mating plate is 60.

FIG. 2: is the perspective side view of the invention 10. The exemplary vehicle wheel is 62.

I claim:

1. An electric vehicle charging system comprising;
a drive sprocket attached to an axle of an electric vehicle;
a chain interconnecting said drive sprocket to a transfer sprocket;
an alternators chain connecting said transfer sprocket to both a first alternator sprocket and a second alternator sprocket;
a first alternator connected to said first alternator sprocket so that said first alternator obtains energy upon rotation of said drive sprocket; and
a second alternator connected to said second alternator sprocket so that said second alternator obtains energy upon rotation of said drive sprocket.

* * * * *